K. O. SANDSTRÖM.
TUBE SCRAPER.
APPLICATION FILED NOV. 9, 1907.

901,484.

Patented Oct. 20, 1908.

Witnesses
C. Heymann
C. A. Singer

Inventor
Klas Olof Sandström
by B. Singer
Atty

UNITED STATES PATENT OFFICE.

KLAS OLOF SANDSTRÖM, OF KARLSKRONA, SWEDEN, ASSIGNOR TO EMIL NILSSON, OF HUSQVARNA, SWEDEN.

TUBE-SCRAPER.

No. 901,484.   Specification of Letters Patent.   Patented Oct. 20, 1908.

Application filed November 9, 1907. Serial No. 401,466.

*To all whom it may concern:*

Be it known that I, KLAS OLOF SANDSTRÖM, foreman, a subject of the King of Sweden, residing at Karlskrona, Sweden, and whose post-office address is Varfsgatan 4, Karlskrona, Sweden, have invented certain new and useful Improvements in Tube-Scrapers; and I do declare the following to be a full, clear, and exact description of the invention, such as will enable others skilled in the art to which it appertains to make and use the same.

This invention relates to improvements in flue cleaners of that kind provided with scrapers.

The invention comprises an expansible scraper casing provided with scraping members adapted to engage the interior portions of the flues, said casing being yieldingly held in a working position by means of springs.

The invention will be more fully described in connection with the accompanying drawings and will be more particularly pointed out and ascertained in and by the appended claims.

Figure 1:
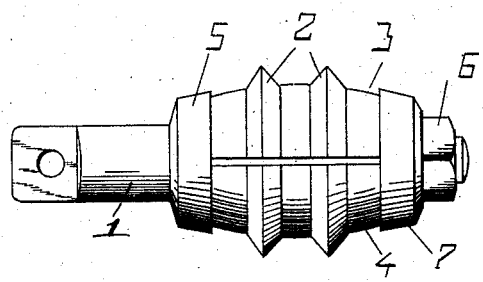
Figure 3:
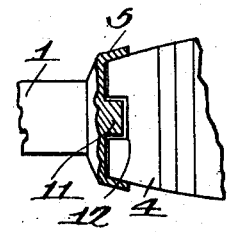
Figure 2:
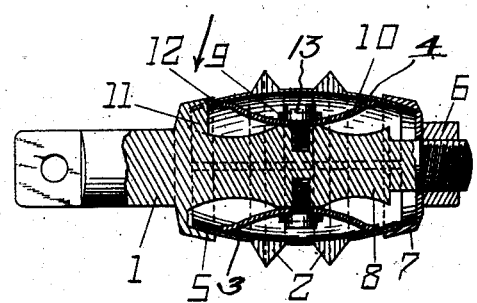

In the drawing: Figure 1, is a side view of the device showing my invention. Fig. 2, is a longitudinal sectional view partly in elevation. Fig. 3, is a plan view partly in section looking in the direction of the arrow of Fig. 2.

Like characters of reference designate similar parts throughout the different figures of the drawing.

As shown a handle 1 is provided having a head 5 and a spindle 8 formed integral therewith. Said spindle 8 is provided with peripherally disposed spring seats or recesses 9 adapted to receive springs 10, the ends of which project outwardly from said seats. Means are provided, preferably in the form of set screws 13, for fastening said springs in their seats. At the opposite end said handle 1 is provided with a head 7 and also with a nut 6 adapted to hold the several parts in assembled relation. An expansible casing composed of sections 3 and 4, is provided having peripherally disposed scraping members 2 adapted to engage the interior portions of the flues. Said sections 3 and 4 are disposed between the heads 5 and 7 with their outer ends beneath the overhanging flanges of said heads and said sections are held in engagement with said flanges by the free ends of the springs 10. The head 5 is provided with means preferably in the form of a retaining lug 11 adapted to engage in the recess 12 of the section 4 to prevent rotation of the casing. When the device is disassembled the nut 6 is removed and also the head 7 whereupon the sections 3 and 4 may be readily withdrawn. Should it be desired to renew the springs it is merely necessary to remove the set screws 13 to release said springs. In assembling the device it is desirable to have the lugs 11 in engagement with the notch 12 so as to prevent the sections 3 and 4 from rotating, after assembled.

When the scraper is reciprocated in the flues the yielding section will cause the scraping member to engage the interior surface of the flues in a manner to effectively remove substances adhered thereto. In case the scraping members engage a substance which is hard the casing sections will yield inwardly and permit the scraping members to pass over such hardened surfaces in a manner to prevent breakage of the part and it will be understood that successive engagement of any hardened substance of the interior of the flue will result in dislodgment.

I claim:—

1. A flue scraper comprising in combination, a spindle provided with peripherally disposed spring seats, springs engaging said seats at their central portions and projecting outwardly at their ends, means engaging said springs at their central portions to hold the same in their seats, an expansible scraper casing provided with scraping members and engaged by the ends of said springs, said spindle being provided with heads engaging said casing, a nut engaging said heads for holding said heads and casing in assembled relation, and means on one of said heads for holding said casing in a non-rotative position.

2. A flue scraper comprising in combination, a spindle provided with peripherally disposed spring seats, and an integrally formed head provided with inclined flanges and a retaining lug, a head adjustably secured to said spindle and provided with an inclined flange, a cylindrical casing comprising two sections provided with annular scraping members and engaging the flanges of said head, and springs centrally anchored in said seats and provided with projecting ends engaging end portions of said casing and maintaining the same in engagement with said flanges.

3. A flue scraper comprising in combination, a spindle provided with a fixed head having inclined casing engaging portions, a cylindrical casing composed of sections adapted to be engaged by said portions, said fixed heads being provided with means preventing rotation of said sections, centrally anchored springs having projecting ends engaging said casing sections near the ends thereof, a head loosely mounted on said spindle and provided with casing engaging portions, and means engaging said loosely mounted heads for adjusting the same to vary the diameter of said casing.

In testimony whereof I affix my signature in presence of two witnesses.

KLAS OLOF SANDSTRÖM.

Witnesses:
E. HEDENSKAG,
A. LARSON.